US011135941B2

(12) United States Patent
Whitt et al.

(10) Patent No.: US 11,135,941 B2
(45) Date of Patent: Oct. 5, 2021

(54) SYSTEMS AND METHODS FOR AUTOMATED SIGNALING FOR NETWORKED PERSONAL MOBILITY VEHICLES

(71) Applicant: Lyft, Inc., San Francisco, CA (US)

(72) Inventors: Carlos Ellis Whitt, San Francisco, CA (US); Steven James Martisauskas, San Francisco, CA (US); Dor Levi, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/235,707

(22) Filed: Dec. 28, 2018

(65) Prior Publication Data

US 2019/0375329 A1 Dec. 12, 2019

Related U.S. Application Data

(60) Provisional application No. 62/681,661, filed on Jun. 6, 2018.

(51) Int. Cl.
*B60Q 1/34* (2006.01)
*B60Q 1/44* (2006.01)
(Continued)

(52) U.S. Cl.
CPC ............. *B60L 58/13* (2019.02); *B60Q 1/346* (2013.01); *B60Q 1/444* (2013.01); *B60R 25/245* (2013.01);
(Continued)

(58) Field of Classification Search
CPC ......... B60L 58/13; B60Q 1/346; B60Q 1/444; B60R 2325/205; B60R 25/245;
(Continued)

(56) References Cited

U.S. PATENT DOCUMENTS

2003/0177062 A1   9/2003   Chen
2008/0122605 A1   5/2008   Tengler et al.
(Continued)

FOREIGN PATENT DOCUMENTS

CN    104217583 A    12/2014
EP    2 573 720 A1   3/2013
(Continued)

OTHER PUBLICATIONS

Whitt et al., "Systems and Methods for Matching Transportation Requests to Personal Mobility Vehicles", U.S. Appl. No. 16/207,002, filed Nov. 30, 2018, 83 pages.
(Continued)

*Primary Examiner* — Omer S Khan
(74) *Attorney, Agent, or Firm* — Haynes and Boone, LLP

(57) ABSTRACT

The disclosed computer-implemented method may include automated signaling for networked personal mobility vehicles (PMVs). In some embodiments, a system may identify a PMV in use by a transportation requestor taking a trip. The system may also predict one or more actions of the PMV based on navigational data for the trip. Additionally, the system may select one or more signals corresponding to a predicted action of the PMV. In some embodiments, the system may determine, based on a current state of the PMV, that the predicted action of the PMV will be initiated within a time frame. Furthermore, the system may send a start command to the PMV to initiate a signal in response to determining the predicted action will be initiated. Various other methods, systems, and computer-readable media are also disclosed.

20 Claims, 10 Drawing Sheets

(51) Int. Cl.

| | |
|---|---|
| *B60L 58/13* | (2019.01) |
| *G07C 5/00* | (2006.01) |
| *G06Q 10/02* | (2012.01) |
| *G06Q 50/30* | (2012.01) |
| *G01C 21/34* | (2006.01) |
| *G06K 9/00* | (2006.01) |
| *B60W 10/08* | (2006.01) |
| *B60W 10/18* | (2012.01) |
| *B60W 10/20* | (2006.01) |
| *B60W 10/30* | (2006.01) |
| *B60W 50/12* | (2012.01) |
| *G08G 1/16* | (2006.01) |
| *G08G 1/01* | (2006.01) |
| *G01C 21/20* | (2006.01) |
| *H04W 4/029* | (2018.01) |
| *H04W 4/40* | (2018.01) |
| *B60R 25/24* | (2013.01) |

(52) U.S. Cl.
CPC ............ *B60W 10/08* (2013.01); *B60W 10/18* (2013.01); *B60W 10/20* (2013.01); *B60W 10/30* (2013.01); *B60W 50/12* (2013.01); *G01C 21/20* (2013.01); *G01C 21/3415* (2013.01); *G01C 21/3423* (2013.01); *G01C 21/3438* (2013.01); *G01C 21/3461* (2013.01); *G01C 21/3492* (2013.01); *G06K 9/00798* (2013.01); *G06Q 10/02* (2013.01); *G06Q 50/30* (2013.01); *G07C 5/004* (2013.01); *G07C 5/008* (2013.01); *G08G 1/0125* (2013.01); *G08G 1/163* (2013.01); *G08G 1/165* (2013.01); *H04W 4/029* (2018.02); *H04W 4/40* (2018.02); *B60R 2325/205* (2013.01); *B60W 2300/365* (2013.01); *B60W 2510/244* (2013.01); *B60W 2552/00* (2020.02); *B60W 2552/15* (2020.02); *B60W 2710/086* (2013.01); *B60W 2710/18* (2013.01); *B60W 2710/20* (2013.01); *B60W 2710/30* (2013.01); *B60W 2720/10* (2013.01); *B62K 2202/00* (2013.01)

(58) Field of Classification Search
CPC ...... B60W 10/08; B60W 10/18; B60W 10/20; B60W 10/30; B60W 2300/365; B60W 2510/244; B60W 2552/00; B60W 2552/15; B60W 2710/086; B60W 2710/18; B60W 2710/20; B60W 2710/30; B60W 2720/10; B60W 50/12; B62K 2202/00
See application file for complete search history.

(56) References Cited

U.S. PATENT DOCUMENTS

| | | | |
|---|---|---|---|
| 2009/0069977 A1* | 3/2009 | Markyvech | B60Q 1/346 701/41 |
| 2010/0308984 A1* | 12/2010 | Ehrlich | B60Q 1/0088 340/431 |
| 2011/0133918 A1 | 6/2011 | Lee et al. | |
| 2012/0143401 A1* | 6/2012 | Jayadevappa | B62H 3/00 701/2 |
| 2013/0046456 A1 | 2/2013 | Scofield et al. | |
| 2013/0173146 A1 | 7/2013 | Atmur et al. | |
| 2015/0074004 A1 | 3/2015 | Song | |
| 2015/0092056 A1 | 4/2015 | Rau et al. | |
| 2015/0305426 A1 | 10/2015 | Lee et al. | |
| 2016/0069696 A1 | 3/2016 | Salowitz | |
| 2016/0131492 A1 | 5/2016 | Sheha et al. | |
| 2016/0306350 A1 | 10/2016 | Shim et al. | |
| 2016/0368492 A1* | 12/2016 | Al-Stouhi | G08G 1/162 |
| 2017/0030728 A1 | 2/2017 | Baglino et al. | |
| 2017/0160094 A1* | 6/2017 | Zhang | H04N 9/3161 |
| 2017/0191845 A1 | 7/2017 | Marueli et al. | |
| 2017/0236415 A1 | 8/2017 | Okabe et al. | |
| 2017/0243492 A1 | 8/2017 | Lambert et al. | |
| 2017/0364995 A1 | 12/2017 | Yan | |
| 2018/0018840 A1 | 1/2018 | Xia et al. | |
| 2018/0096445 A1 | 4/2018 | Eyler et al. | |
| 2018/0114258 A1 | 4/2018 | Ross et al. | |
| 2018/0118106 A1* | 5/2018 | You | G06K 9/00791 |
| 2018/0194349 A1* | 7/2018 | McGill, Jr. | G05B 13/026 |

FOREIGN PATENT DOCUMENTS

| | | |
|---|---|---|
| EP | 3 188 141 A1 | 7/2017 |
| JP | 2008-037167 A | 2/2008 |
| JP | 2015-060452 | 3/2015 |
| KR | 97-69562 A | 11/1997 |
| KR | 10-2012-0092361 A | 8/2012 |
| WO | 2017/194416 A1 | 11/2017 |
| WO | 2018/079590 A1 | 5/2018 |

OTHER PUBLICATIONS

Whitt et al., "Systems and Methods for Determining Allocation of Personal Mobility Vehicles", U.S. Appl. No. 16/175,723, filed Oct. 30, 2018, 69 pages.
Whitt et al., "Systems and Methods for Battery-Driven Personal Mobility Vehicle Management in Dynamic Transportation Networks", U.S. Appl. No. 16/179,788, filed Nov. 2, 2018, 68 pages.
Whitt et al., "Apparatuses, Systems, and Methods for Increasing Safety in Personal Mobility Vehicle Operation", U.S. Appl. No. 16/181,325, filed Nov. 5, 2018, 81 pages.
Whitt et al., "Systems and Methods for Transport Completion Using Lane-Constrained Vehicles and Personal Mobility Vehicles", U.S. Appl. 16/206,999, filed Nov. 30, 2018, 99 pages.
Whitt et al., "Systems and Methods for Routing Personal Mobility Vehicles Based on Road Conditions", U.S. Appl. No 16/235,699, filed Dec. 28, 2018, 66 pages.

* cited by examiner

SYSTEMS AND METHODS FOR AUTOMATED SIGNALING FOR NETWORKED PERSONAL MOBILITY VEHICLES

CROSS REFERENCE TO RELATED APPLICATION

This application claims the benefit of U.S. Provisional Application No. 62/681,661, filed 6 Jun. 2018, the disclosure of which is incorporated, in its entirety, by this reference.

BACKGROUND

A personal mobility vehicle (PMV), such as a scooter or a bicycle, may provide transportation requestors with flexible, on-demand transportation that facilitates the sharing of vehicles on an as-needed basis. For example, a transportation requestor may rent a scooter for a trip by finding the nearest scooter, riding the scooter to the destination, and checking in the scooter at the destination. Additionally, PMVs that are connected to a network may be tracked and monitored through a centralized system that analyzes the use of such vehicles and provides transportation requestors with information about the PMVs through a device, such as a smartphone.

Many PMVs are manually steered or otherwise manually operated by a transportation requestor, such as by holding the handles of a bicycle. Some PMVs may also require manual signaling when the transportation requestor performs certain maneuvers. For example, a rider on a bicycle may hold out an arm to signal a turn. However, if a transportation requestor does not maintain both hands on a vehicle, the transportation requestor may lose some degree of control over the vehicle or become distracted and less responsive to environmental factors. This may present a safety issue in the operation of a PMV. Thus, the instant disclosure identifies and addresses a need for additional and improved systems and methods for ensuring the safe operation of personal mobility vehicles by transportation requestors.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
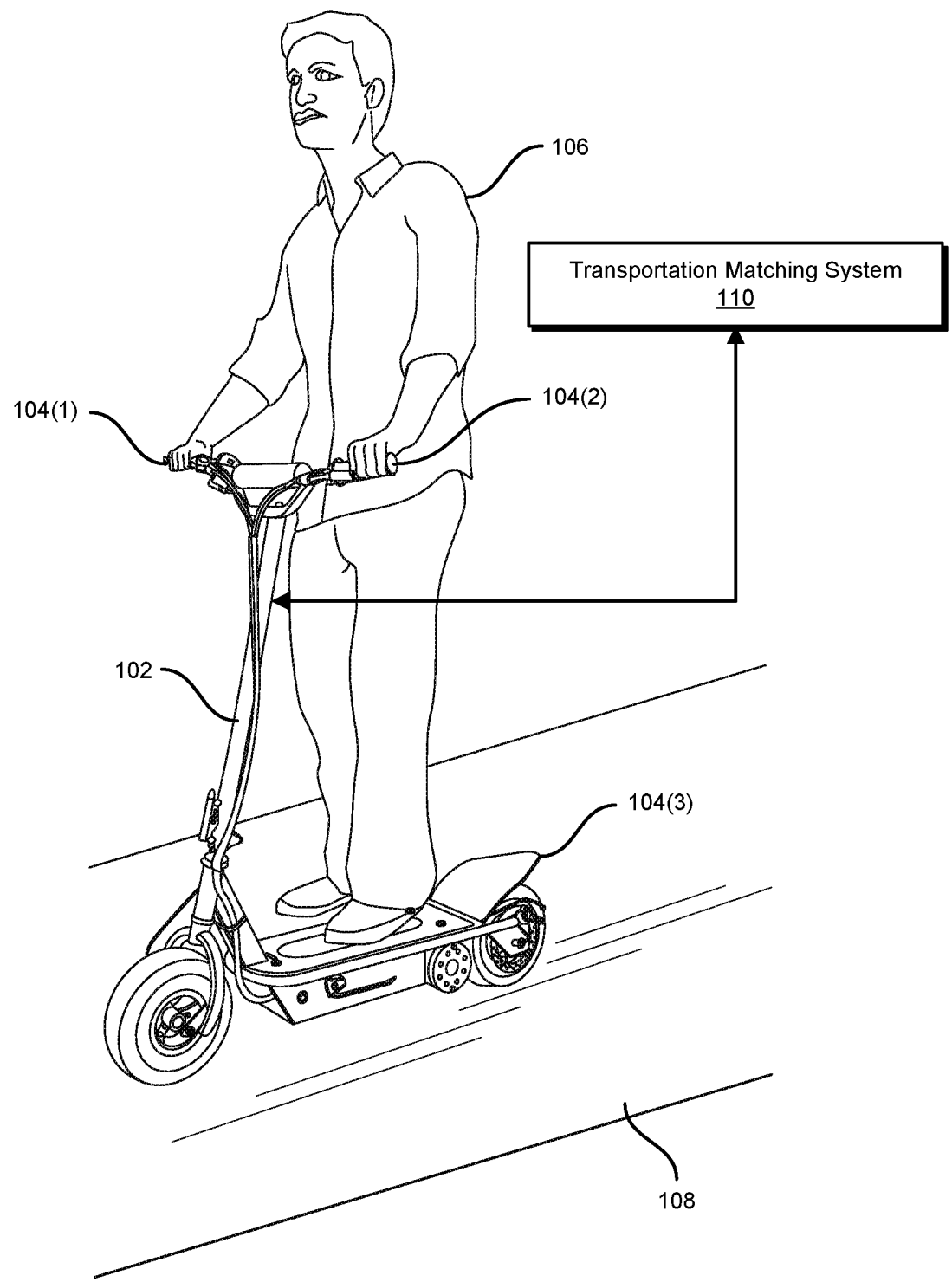
FIG. 1 illustrates a transportation requestor using an example PMV.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to automated signaling for networked PMVs by predicting actions a PMV will take and prompting the PMV to display signals without requiring manual input from a transportation requestor. As will be explained in greater detail below, embodiments of the instant disclosure may, by analyzing the route that a user of a PMV is expected to take for a trip, predict certain actions that the PMV may take along the route that require a signal. For example, by determining that the expected route for a trip includes turns, the disclosed systems and methods may determine that a turn signal will be required along the route. In another example, the disclosed systems and methods may analyze environmental factors like road conditions or traffic to determine when the PMV should brake and decelerate.

By automatically selecting a signal associated with a predicted action, the disclosed systems and methods may then command the PMV to signal to the user and/or others that the action will be taken. For example, the PMV may initiate a light or sound that alerts other motorists on the road when the PMV approaches a location where a signal is expected. In other examples, the PMV may project a visible signal directly onto the road, which also alerts the user that the impending action is to be taken. Additionally, the systems and methods described herein may adjust the strength of the signal based on the likelihood that the action will be taken or based on direct input from the user. For example, in anticipation of approaching a traffic light, the disclosed systems and methods may turn on a brake light to shine weakly. When the PMV begins to actually decelerate, the disclosed systems and methods may increase the intensity of the light to a brighter luminosity. Additionally, when a signal is no longer needed, the disclosed systems and methods may command the PMV to turn off the signal.

Thus, the systems and methods described herein may improve the safe operation of personal mobility vehicles by automating the operation of signals and encouraging users to keep their hands on the controls of a PMV. These systems and methods may also improve the functioning of a computing device that tracks or manages the use of a PMV. In some embodiments, the computing device may be integrated into the PMV. Additionally or alternatively, the computing device may be a mobile device that communicates with the PMV. By offloading some of the mental and/or physical resources needed to execute signals while operating a PMV to an automated computing device, the disclosed systems and methods may therefore improve the experience of a transportation requestor in using the PMV for travel.

As will be explained in greater detail below, a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include lane-constrained vehicles (e.g., cars, light trucks, etc.) that may by size, by practice, and/or by law, be purposed for keeping to a standard road lane. By contrast, a PMV may have the flexibility to occupy bike lanes, walking paths, trails, alleys, and/or other areas that are not a standard road lane. Furthermore, in some examples a PMV may have the flexibility to travel while lane splitting (e.g., occupying an area between standard road lanes amidst lane-constrained traffic), to share a standard road lane abreast with one or more other PMVs, and/or to maneuver through, between, and/or around slow or stopped lane-constrained vehicles in heavy traffic where other lane-constrained vehicles could not maneuver through the heavy traffic. Furthermore, the dynamic transportation network may include personal mobility vehicles including but not limited to bicycles, scooters, electric bicycles, and/or electric scooters. In some embodiments, a dynamic transportation network may include autonomous vehicles (e.g., self-driving cars) that may be capable of operating with little or no input from a human operator.

FIG. 1 illustrates a transportation requestor using an example PMV. As illustrated in FIG. 1, a transportation requestor 106 may ride a PMV 102 on a physical path 108, such as a road or a sidewalk. In some examples, PMV 102 may represent a motorize vehicle, such as a scooter. Additionally or alternatively, PMV 102 may require some degree of manual operation, such as a bicycle that requires transportation requestor 106 to pedal. In some embodiments, PMV 102 may also include one or more signals that indicate to transportation requestor 106 or others that an action will be taken. In the example of FIG. 1, PMV 102 may include visible-light signals 104(1) and 104(2) that represent turn signals and a signal 104(3) that represents a brake light. Additionally or alternatively, PMV 102 may include an audible signal, such as a horn, and/or a navigation indicator that may project onto physical path 108. For example, the navigation indicator may project a visible-light arrow to signal to transportation requestor and/or others that PMV 102 will make a turn in the direction of the arrow. Furthermore, a transportation matching system 110 connected to PMV 102 may represent a dynamic matching system that matches transportation requestor 106 to PMV 102. For example, transportation matching system 110 may represent transportation management system 902 of FIG. 9 to manage communications between devices used by transportation requestor 106 and devices controlling PMV 102.

Figure 2:
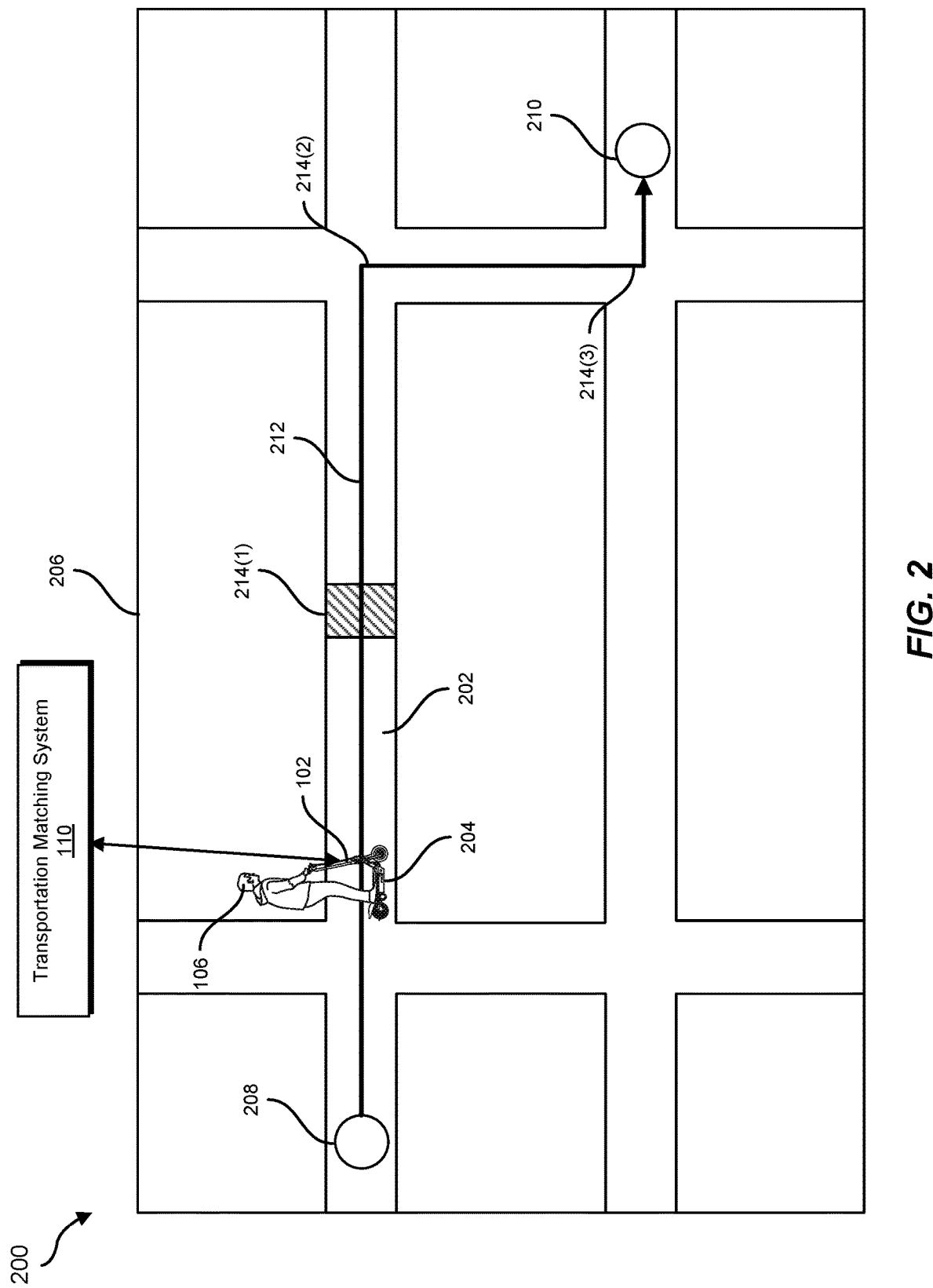
FIG. 2 is an illustration of an example representation of a PMV navigating a trip.

FIG. 2 is an illustration of an example representation of a PMV navigating a trip. As illustrated in FIG. 2, transportation requestor 106 on PMV 102 may take a trip 200 from an origin 208 to a destination 210. The disclosed systems and methods may then predict, based on navigational data 206, an action 202 that PMV 102 will take. In some examples, navigational data 206 may include origin 208 of trip 200, destination 210 of trip 200, an expected route 212 for trip 200, an expected condition along expected route 212, and/or a potential external condition along expected route 212. In the example of FIG. 2, expected route 212 may include conditions 214(1), 214(2), and 214(3). In this example, condition 214(1) may represent a pedestrian crosswalk, condition 214(2) may represent a right turn along expected route 212, and condition 214(3) may represent a left turn along expected route 212.

In some examples, expected route 212 may include a planned route determined prior to a start of trip 200. In these examples, information such as navigational data 206 may help determine expected route 212. For example, expected route 212 may be planned based on input from transportation requestor 106, including a selection of destination 210. Transportation requestor 106 may also input preferences for trip 200, such as preferred types of roads or types of vehicles, and transportation matching system 110 may suggest PMV 102 to transportation requestor 106. In this example, transportation requestor 106 may input destination 210 and/or additional information into a requestor's device, such as computing device 924 and/or tablet 922 of FIG. 9, and a backend service such as transportation matching system 110 and/or transportation management system 902 may subsequently send the information and/or a calculated expected route 212 to PMV 102, the requestor's device, and/or a transportation provider's device over networks 910 and/or 912. Additionally or alternatively, transportation requestor 106 may directly input the information into a device integrated with PMV 102. The device integrated with PMV 102 may then calculate or adjust expected route 212 based on the received information.

Figure 9:
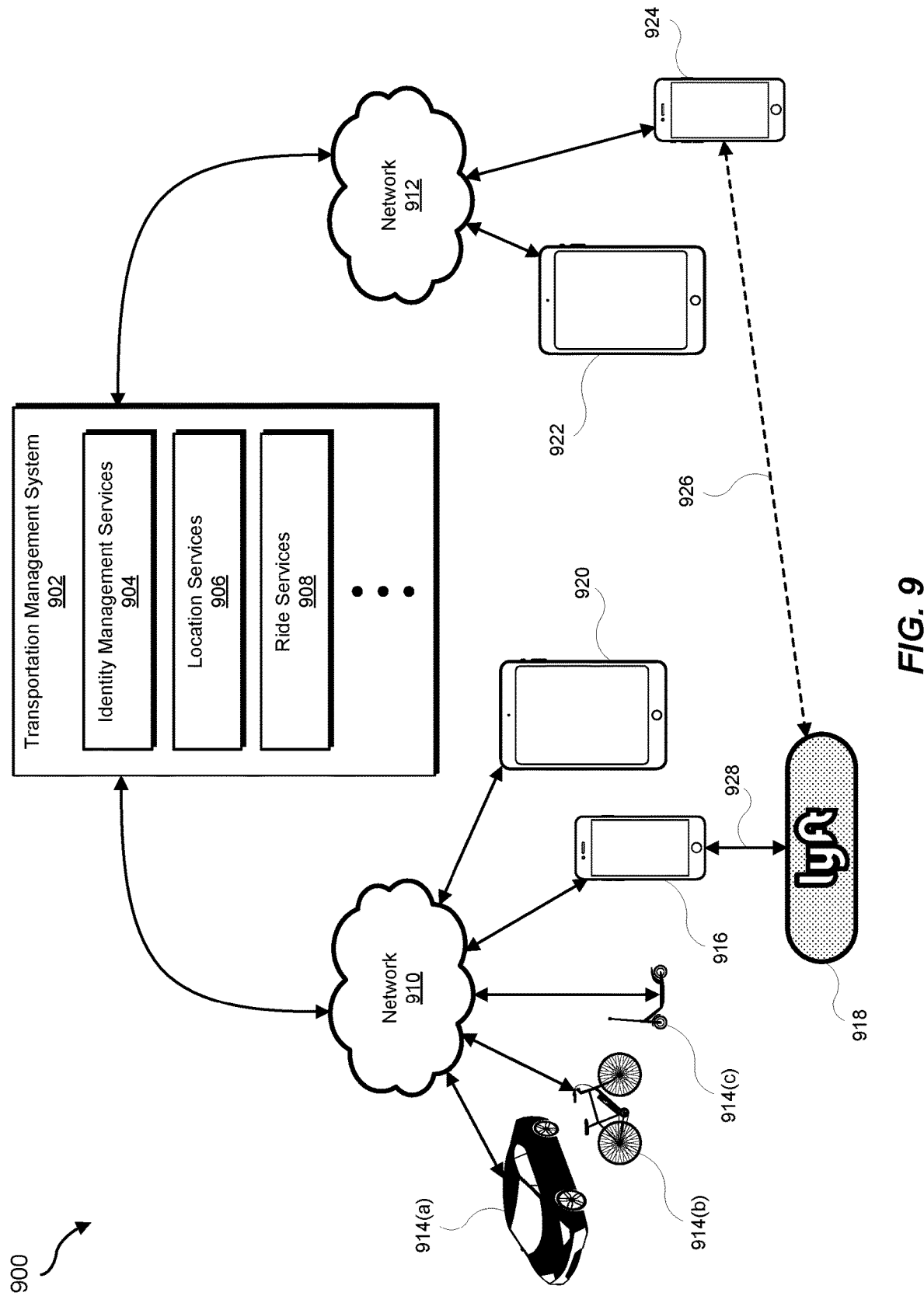
FIG. 9 is an illustration of an example requestor/provider management environment.

In some embodiments, transportation matching system 110 and/or transportation management system 902 of FIG. 9 may determine expected route 212 of FIG. 2 by including other variables in the calculation. For example, trip 200 may include a potential for transportation requestor 106 to transfer between PMV 102 and one or more other vehicles, such as vehicles 914(a), 914(b) and/or 914(c) in FIG. 9. In this example, origin 208 and/or destination 210 may represent transfer points as part of a longer trip. Additionally, the transfer points may be dynamically determined based on data collected by transportation matching system 110 and/or transportation management system 902 about the other vehicles, such as the closest transfer vehicle at a given time or a route with a higher likelihood of enabling transportation requestor 106 to match with a transportation provider to transfer to a shared ride. For example, trip 200 may represent a portion of a longer trip wherein trip 200 is easier to traverse on a bicycle and the remainder of the trip is easier to traverse with an automobile. In this example, transportation matching system 110 and/or transportation management system 902 may determine expected route 212 by determining that transportation requestor 106 is close to origin 208 to use PMV 102 and destination 210 is in a high-traffic area where transportation requestor 106 may leave PMV 102 and transfer to a shared ride.

In other embodiments, transportation matching system 110 and/or transportation management system 902 of FIG. 9 may additionally or alternatively determine expected route 212 of FIG. 2 based on a holistic approach to managing a network of vehicles and/or transportation requestors that includes PMV 102 and transportation requestor 106. In the previous example, destination 210 may be selected by transportation matching system 110 and/or transportation management system 902 as a location to leave PMV 102 to increase the convenience for another transportation requestor to use PMV 102 on a separate trip originating from the selected location. As another example, multiple riders sharing a ride with a transportation provider may converge at a common destination and/or origin point to transfer to and/or from additional vehicles, such as PMV 102. In this example, multiple transportation providers may alternatively match with the multiple transportation requestors in multiple transfers. Transportation matching system 110 and/or transportation management system 902 may consider the locations and/or availability of each transportation provider to maximize the efficiency of the multiple transfers and the various expected routes of each transportation requestor. Additionally, in some examples, transportation matching system 110 and/or transportation management system 902 may determine multiple transportation requestors are traveling on similar routes for part or all of the trips and, in response, may adjust some of the routes to avoid potential congestion along the routes.

In further embodiments, factors such as road conditions and/or a condition of PMV 102 may affect the determination of expected route 212. In these embodiments, transportation matching system 110 and/or transportation management system 902 of FIG. 9 may collect additional data from other services and/or from transportation providers in addition to managing data about each vehicle. For example, transportation matching system 110 and/or transportation management system 902 may identify a portion of a street closed for roadwork and may subsequently calculate an improved planned route to bypass the closed street. As another example, transportation matching system 110 and/or transportation management system 902 may detect that PMV 102 has a low amount of battery power and calculate expected route 212 with the shortest travel time to prevent PMV 102 from losing power during trip 200 and/or adjust expected route 212 to include a transfer to a different PMV with more remaining battery power for a remainder of trip 200.

In additional or alternative examples, expected route 212 of FIG. 2 may include an adjusted route dynamically determined during trip 200. For example, if transportation requestor 106 misses the turn at condition 214(2) along expected route 212, expected route 212 may adjust to a different route arriving at destination 210. In these examples, the data collected in the above embodiments may also be monitored for changes to adjust expected route 212. For example, transportation matching system 110 and/or transportation management system 902 may collect data about the speeds of vehicles in the network and may determine that part of expected route 212 is experiencing heavy traffic causing delays. Expected route 212 may then be rerouted to avoid the traffic and reach destination 210 in less time. In another example, automobile traffic may decrease from a previously congested state such that expected route 212 is adjusted to suggest transportation requestor 106 transfer from PMV 102 to a ride share option for a faster trip and/or match transportation requestor 106 to a different transportation provider from a previous provider for a portion of the trip. Additionally or alternatively, in some embodiments, transportation requestor 106 may adjust expected route 212 by deciding to take a different route, canceling part or all of trip 200, or transferring to a different vehicle. In these embodiments, transportation matching system 110 and/or transportation management system 902 and/or PMV 102 may calculated the adjusted route using the new input from transportation requestor 106 and/or a changed state of PMV 102.

In one embodiment, predicting action 202 of PMV 102 may include determining that a condition along expected route 212 increases a likelihood of action 202, such that the likelihood exceeds a predetermined threshold. In the example of FIG. 2, action 202 may representing PMV 102 decelerating to a stop due to condition 214(1) of a pedestrian crosswalk. The disclosed systems and methods may predict that a pedestrian crossing the street across the path of expected route 212 increases the likelihood of PMV 102 stopping at the pedestrian crosswalk. Thus, the likelihood of action 202 may increase as PMV 102 approaches condition 214(1).

The systems and methods described herein may then determine, based on a current state 204 of PMV 102, that predicted action 202 will be initiated within a time frame. In some embodiments, current state 204 of PMV 102 may include a location of PMV 102, a movement of PMV 102, and/or a state of transportation requestor 106 using PMV 102. In the above example, current state 204 may indicate a short distance from condition 214(1), which may then indicate that predicted action 202 will soon be initiated. In other examples, a detected movement, such as a gyroscope detecting an orientation or speed of PMV 102, may indicate that predicted action 202 is being or will soon be initiated. As another example, a movement or a position of transportation requestor 106, such as putting a foot on a brake pedal, may indicate that transportation requestor 106 is initiating action 202.

Figure 3:
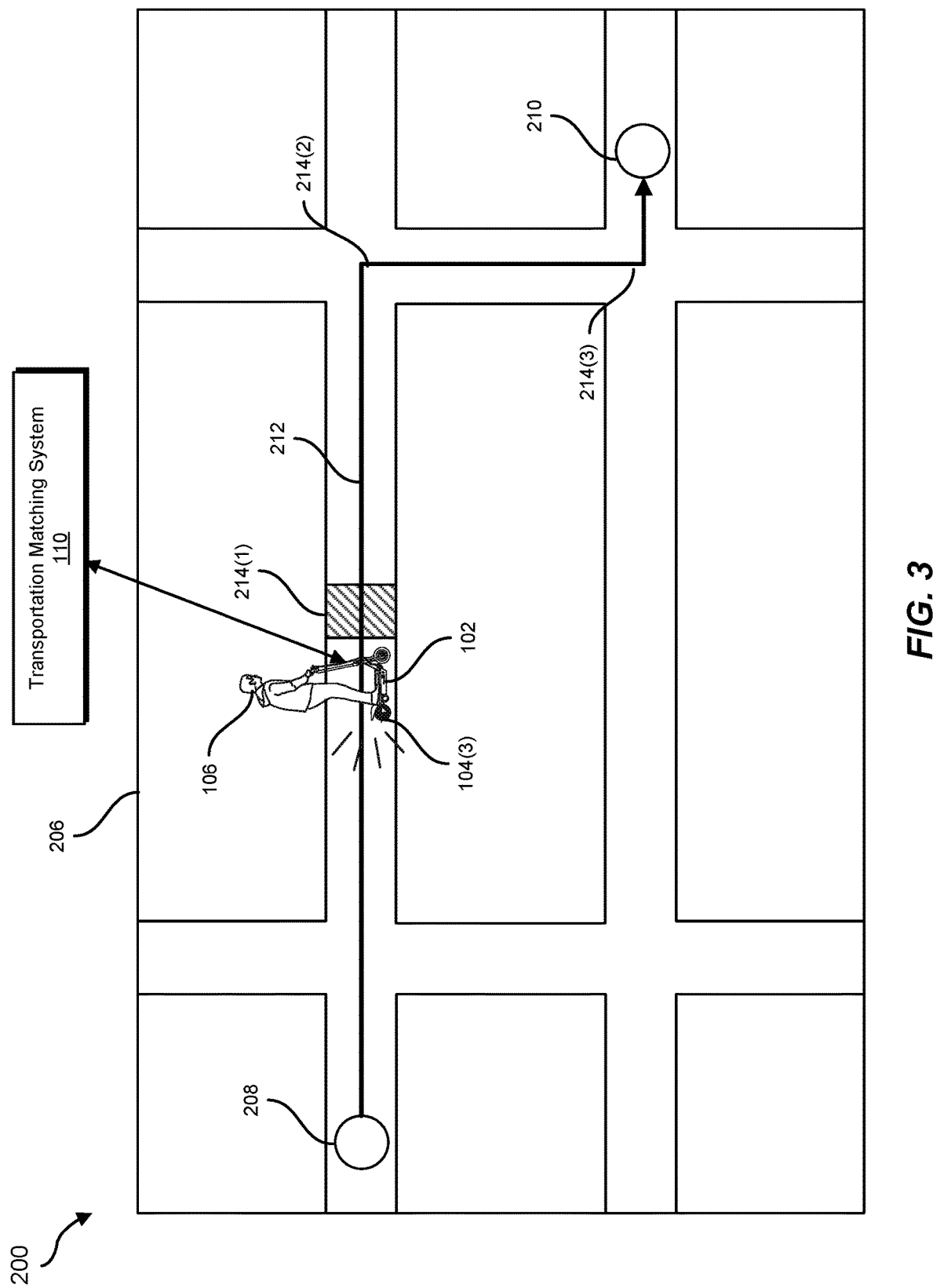
FIG. 3 is an illustration of an example representation of a PMV performing a predicted action during a trip.

FIG. 3 is an illustration of an example representation of a PMV performing a predicted action during a trip. As illustrated in FIG. 3, the disclosed systems and methods may select signal 104(3) corresponding to predicted action 202 of FIG. 2 and, when PMV 102 performs action 202, send a start command to PMV 102 to initiate signal 104(3). In the example of FIG. 3, PMV 102 may begin to stop at condition 214(1), and signal 104(3) may represent a brake light turning on in response to PMV 102 coming to a stop.

As described above, changes to expected route 212 may include subsequent changes to predicted action 202, which may then trigger changes to associated signals. For example, if transportation requestor turns before reaching condition 214(1), predicted action 202 of braking may no longer be necessary and signal 104(3) may be canceled. Additionally or alternatively, new actions predicted as part of an adjusted expected route 212 may require new signals for PMV 102.

Figure 4:
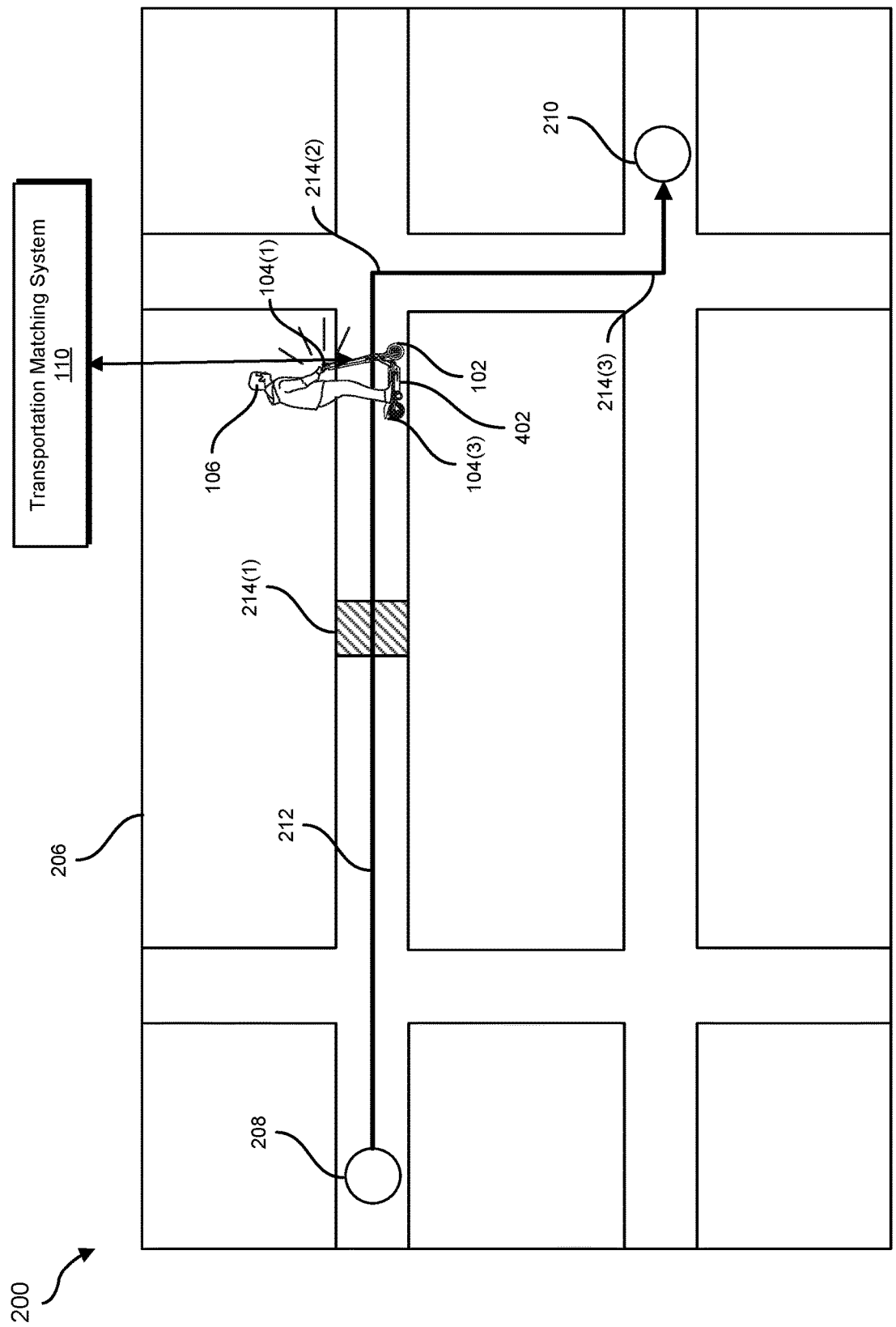
FIG. 4 is an illustration of an example representation of a change in the state of a PMV during a trip.

FIG. 4 is an illustration of an example representation of a change in the state of a PMV during a trip. As illustrated in FIG. 4, a changed state 402 of PMV 102 may represent passing condition 214(1) associated with signal 104(3) and approaching condition 214(2). In some embodiments, the systems and methods described herein may detect changed state 402 of PMV 102 and send an additional command to PMV 102 based on changed state 402. In these embodiments, the additional command may include a stop command to PMV 102 to end signal 104(3) and/or a change command to PMV 102 to change a property of signal 104(3).

In the example of FIG. 4, changed state 402 may indicate signal 104(3) is no longer needed and the additional command may request turning off signal 104(3). Additionally, in this example, changed state 402 may indicate a different signal is needed as PMV 102 approaches condition 214(2). The disclosed systems and methods may then turn on signal 104(1) in anticipating of a different predicted action (i.e., a right turn). In another example, the disclosed systems and methods may change a strength of a signal, such as signal 104(1), based on changed state 402. In this example, signal 104(1) may be a weak signal as PMV 102 approaches condition 214(1), and signal 104(1) may change to a strong signal as PMV 102 initiates the turn at condition 214(1). In some embodiments, the disclosed systems and methods may continue to monitor changes in the current state of PMV 102 and send updated commands to PMV 102 in response to the changing state of PMV 102 throughout trip 200.

Figure 5:
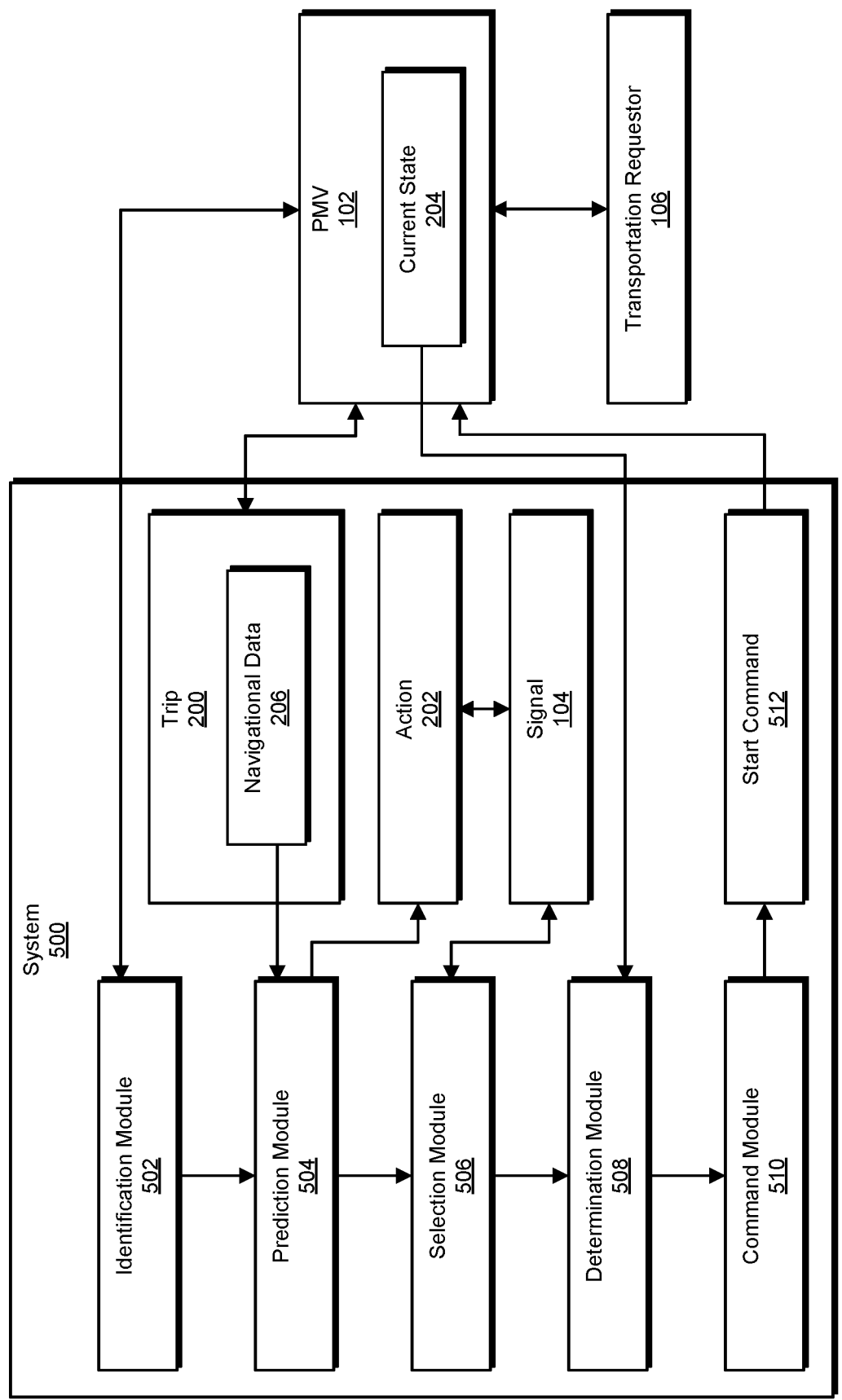
FIG. 5 is a block diagram of an example system for automated signaling for networked PMVs.

FIG. 5 is a block diagram of an example system 500 for automated signaling for networked PMVs. In one embodiment, system 500 may represent a transportation provider device, such as a mobile device, that communicates with PMV 102 to execute commands. Additionally or alternatively, system 500 may be integrated into PMV 102 and may directly manage the signals of PMV 102. In some embodiments, system 500 may also represent a computing system connected to or integrated with a system and/or network that manages multiple PMVs, such as transportation matching system 110 of FIG. 1 and/or transportation management system 902 of FIG. 9. System 500 may alternatively represent all or a portion of transportation matching system 110 and/or transportation management system 902.

As shown in FIG. 5, system 500 may be configured with one or more modules, stored in memory, that perform one or more of the steps described herein. For example, system 500 may include an identification module 502 that identifies PMV 102 in use by transportation requestor 106 taking trip 200. System 500 may also include a prediction module 504 that predicts action 202 of PMV 102 based on navigational data 206 for trip 200. Additionally, system 500 may include a selection module 506 that selects signal 104 corresponding to predicted action 202 of PMV 102. Furthermore, system 500 may include a determination module 508 that determines, based on current state 204 of PMV 102, that predicted action 202 of PMV 102 will be initiated within a time frame.

In the above example, system 500 may also include a command module 510 that sends a start command 512 to PMV 102 to initiate signal 104 in response to determining predicted action 202 will be initiated. In some examples, start command 512 to initiate signal 104 may include the signal to initiate and a strength of signal 104 based on current state 204 of PMV 102. PMV 102 may then initiate signal 104 in response to receiving start command 512 from system 500.

Figure 6:
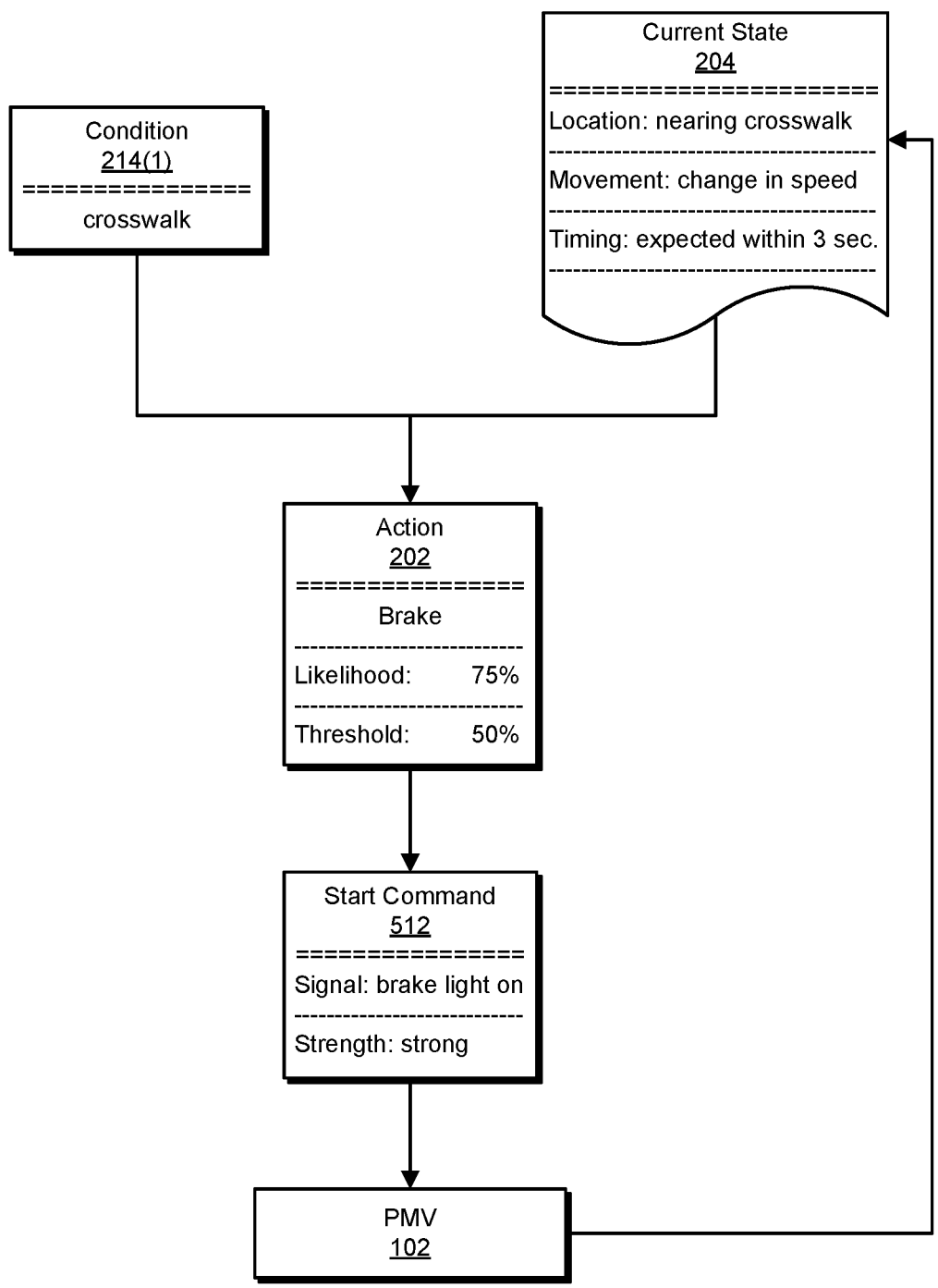
FIG. 6 is a block diagram of an example prediction of an action of a PMV based on the current state of the PMV.

FIG. 6 is a block diagram of an example prediction of an action of a PMV based on the current state of the PMV. As shown in FIG. 6, system 500 of FIG. 5 may predict action 202 (e.g., brake) by determining that condition 214(1) (e.g., a crosswalk) along expected route 212 of trip 200 in FIGS. 2-4 increases a likelihood of action 202 of PMV 102, such that the likelihood exceeds a predetermined threshold. In this example, current state 204 of PMV 102 may include a location of PMV 102 (e.g., "nearing crosswalk") and a movement of PMV 102 (e.g., "change in speed"). System 500 may then determine that predicted action 202 will be initiated within a time frame by detecting current state 204 and determining that a timing of current state 204 (e.g., "expected within 3 sec.") indicates predicted action 202 will be initiated within the time frame. In this example, the time frame may be a time longer than 3 seconds such that signal 104 may be initiated prior to executing action 202.

In the example of FIG. 6, the likelihood of action 202 may increase to 75% based on current state 204 of PMV 102 nearing condition 214(1). Given a predetermined threshold of 50%, the increased likelihood may trigger start command 512 to send a signal (e.g., "brake light on") to PMV 102. In this example, the signal may be selected based on a set of rules, such as traffic laws that govern the operation of PMVs. For example, action 202 may be required to be accompanied by a visible brake light signal when PMV 102 is traveling on a road. Additionally, in this example, system 500 may determine that the brake light of FIG. 6 should be a strong signal to clearly indicate braking.

Figure 7:
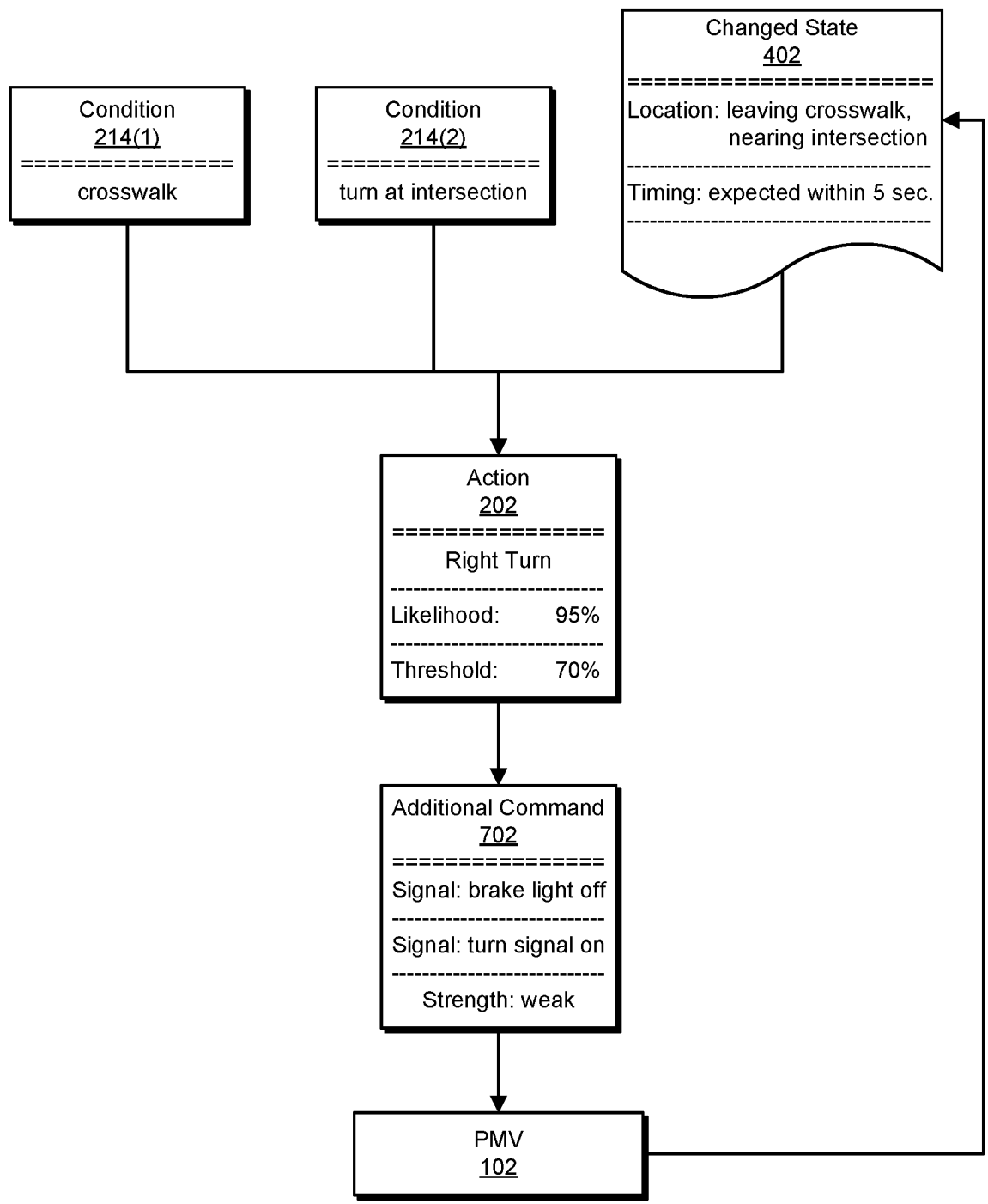
FIG. 7 is a block diagram of an example command to a PMV in response to a changed state of the PMV.

FIG. 7 is a block diagram of an example command to a PMV in response to a changed state of the PMV. As shown in FIG. 7, changed state 402 may be detected and analyzed in a similar manner to current state 204 of FIG. 6. In this example, changed state 402 may include a location of PMV 102 (e.g., "leaving crosswalk") that corresponds to turning off a brake light and a second description of the location (e.g., "nearing intersection") that corresponds to turning on a turn signal. Additionally, the example of FIG. 7 may predict a new action 202 (e.g., right turn) based on navigational data including condition 214(1) and condition 214(2). The combination of conditions 214(1) and 214(2) with changed state 402 may indicate a high likelihood of action 202 above the predetermined threshold.

In one embodiment, system 500 of FIG. 5 may then send additional command 702 of FIG. 7 to PMV 102 based on changed state 402. In this embodiment, additional command 702 may include a stop command to PMV 102 to end a signal (e.g., "brake light off") and/or a change command to PMV 102 to change a property of the signal (e.g., weak strength). Additionally, in the example of FIG. 7, additional command 702 may initiated a new signal (e.g., "turn signal on") concurrently with the change to a previous signal.

In some examples, a two-tier signaling system may be implemented to control the strength and/or timing of signals based on the current state of PMV 102. For example, current state 204 of PMV 102 may indicate a lower likelihood of action 202, which may set the strength of signal 104 to a lower intensity. Alternatively, direct input from transportation requestor 106 and/or current state 204 including a state of transportation requestor 106 may indicate a higher likelihood of action 202, which may set the strength of signal 104 to a greater intensity.

In some embodiments, as in the examples of FIGS. 6 and 7, PMV 102 may continually update current state 204 and/or changed state 402 during the course of trip 200. In these embodiments, system 500 may continually predict new actions or update the likelihood of previously predicted actions in order to generate updated commands for signaling. In these embodiments, system 500 may create a feedback loop with PMV 102 to update current state 204 and the state of signals on PMV 102.

Figure 8:
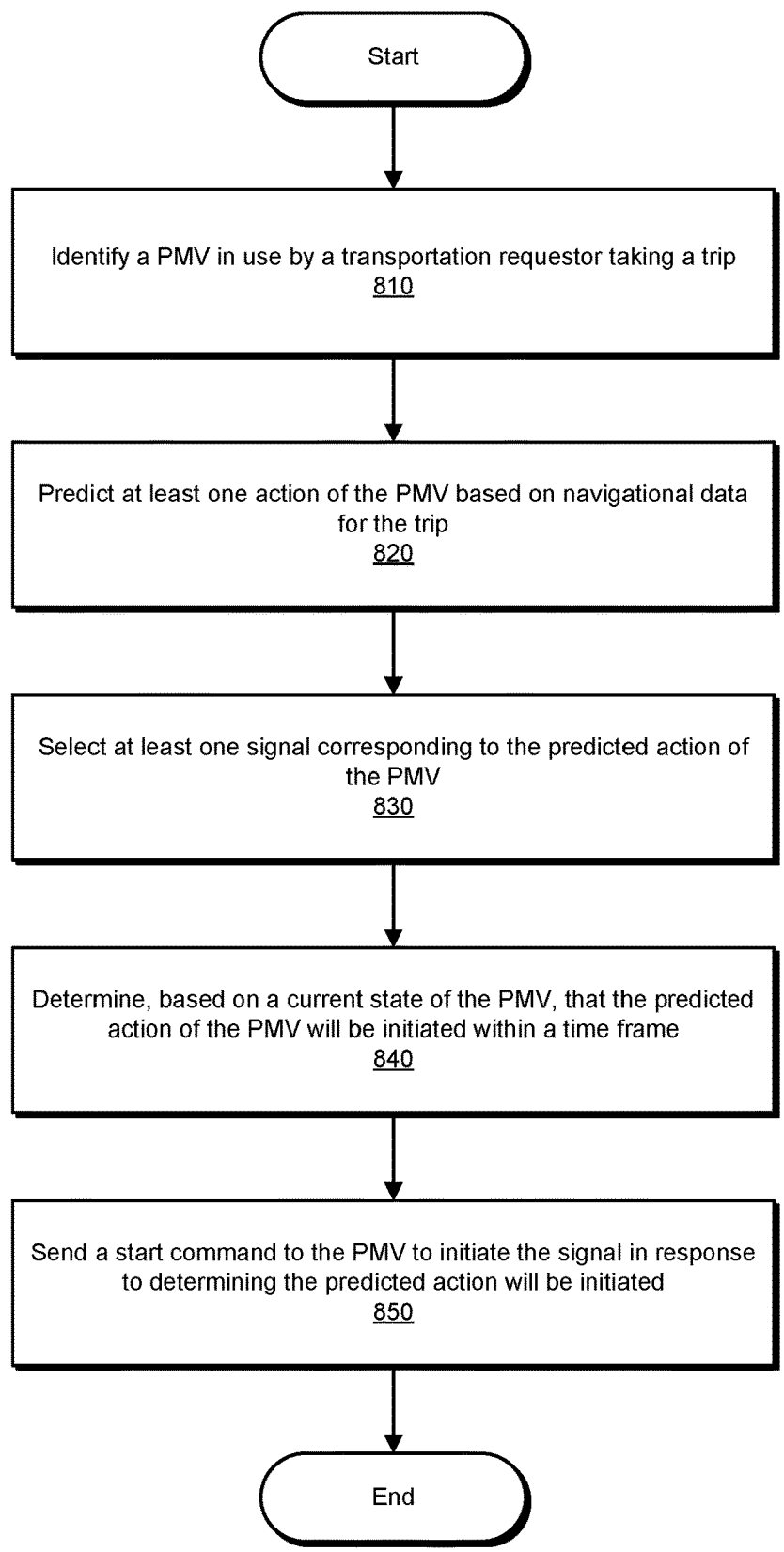
FIG. 8 is a flow diagram of an example method for automated signaling for networked PMVs.

FIG. 8 is a flow diagram of an example computer-implemented method 800 for automated signaling for networked PMVs. As illustrated in FIG. 8, at step 810, one or more of the systems described herein may identify a PMV in use by a transportation requestor taking a trip.

At step 820, one or more of the systems described herein may predict one or more actions of the PMV based on navigational data for the trip.

In one embodiment, the navigational data may include an origin of the trip, a destination of the trip, an expected route for the trip, an expected condition along the expected route, and/or a potential external condition along the expected route. In this embodiment, the expected route for the trip may include a planned route determined prior to a start of the trip and/or an adjusted route dynamically determined during the trip. Furthermore, in this embodiment, the systems described herein may predict an action of the PMV by determining that a condition along the expected route of the trip increases a likelihood of the action of the PMV, such that the likelihood exceeds a predetermined threshold.

At step 830, one or more of the systems described herein may select one or more signals corresponding to the predicted action of the PMV. In some examples, a signal may include a visible-light signal located on the PMV, an audible signal located on the PMV, and/or a navigation indicator projected onto a physical path on which the PMV is traveling.

At step 840, one or more of the systems described herein may determine, based on a current state of the PMV, that the predicted action of the PMV will be initiated within a time frame. In some embodiments, the current state of the PMV may include a location of the PMV, a movement of the PMV, and/or a state of the transportation requestor using the PMV.

In one example, the systems described herein may determine that the predicted action of the PMV will be initiated within the time frame by detecting the current state of the PMV and determining that a timing of the current state of the PMV indicates the predicted action of the PMV will be initiated within the time frame.

At step 850, one or more of the systems described herein may send a start command to the PMV to initiate the signal in response to determining the predicted action will be initiated. In one embodiment, the start command to the PMV to initiate the signal may include the signal to initiate and a strength of the signal based on the current state of the PMV.

In some embodiments, the systems described herein may further detect a changed state of the PMV and send an additional command to the PMV based on the changed state of the PMV. In these embodiments, the additional command may include a stop command to the PMV to end the signal and/or a change command to the PMV to change a property of the signal.

FIG. 9 shows a transportation management environment 900, in accordance with various embodiments. As shown in FIG. 9, a transportation management system 902 may run one or more services and/or software applications, including identity management services 904, location services 906, ride services 908, and/or other services. Although FIG. 9 shows a certain number of services provided by transportation management system 902, more or fewer services may be provided in various implementations. In addition, although FIG. 9 shows these services as being provided by transportation management system 902, all or a portion of any of the services may be processed in a distributed fashion. For example, computations associated with a service task may be performed by a combination of transportation management system 902 (including any number of servers, databases, etc.), one or more devices associated with a provider (e.g., devices integrated with managed vehicles 914(*a*), 914(*b*), and/or 914(*c*); provider computing devices 916 and tablets 920; and transportation management vehicle devices 918), and/or more or more devices associated with a ride requestor (e.g., the requestor's computing devices 924 and tablets 922). In some embodiments, transportation management system 902 may include one or more general purpose computers, server computers, clustered computing systems, cloud-based computing systems, and/or any other computing systems or arrangements of computing systems. Transportation management system 902 may be configured to run any or all of the services and/or software components described herein. In some embodiments, transportation management system 902 may include an appropriate operating system and/or various server applications, such as web servers capable of handling hypertext transport protocol (HTTP) requests, file transfer protocol (FTP) servers, database servers, etc.

In some embodiments, identity management services 904 may be configured to perform authorization services for requestors and providers and/or manage their interactions and/or data with transportation management system 902. This may include, e.g., authenticating the identity of providers and determining that they are authorized to provide services through transportation management system 902. Similarly, requestors' identities may be authenticated to determine whether they are authorized to receive the requested services through transportation management system 902. Identity management services 904 may also manage and/or control access to provider and/or requestor data maintained by transportation management system 902, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 902 may also manage and/or control access to provider and/or requestor data stored with and/or obtained from third-party systems. For example, a requestor or provider may grant transportation management system 902 access to a third-party email, calendar, or task management system (e.g., via the user's credentials). As another example, a requestor or provider may grant, through a mobile device (e.g., 916, 920, 922, or 924), a transportation application associated with transportation management system 902 access to data provided by other applications installed on the mobile device. In some examples, such data may be processed on the client and/or uploaded to transportation management system 902 for processing.

In some embodiments, transportation management system 902 may provide ride services 908, which may include ride matching and/or management services to connect a requestor to a provider. For example, after identity management services module 904 has authenticated the identity a ride requestor, ride services module 908 may attempt to match the requestor with one or more ride providers. In some embodiments, ride services module 908 may identify an appropriate provider using location data obtained from location services module 906. Ride services module 908 may use the location data to identify providers who are geographically close to the requestor (e.g., within a certain threshold distance or travel time) and/or who are otherwise a good match with the requestor. Ride services module 908 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 908 may use rule-based algorithms and/or machine-learning models for matching requestors and providers.

Transportation management system 902 may communicatively connect to various devices through networks 910 and/or 912. Networks 910 and 912 may include any combination of interconnected networks configured to send and/or receive data communications using various communication protocols and transmission technologies. In some embodiments, networks 910 and/or 912 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 910 and/or 912 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.11 family of standards, Bluetooth, Bluetooth Low Energy, Near Field Communication (NFC), Z-Wave, and ZigBee). In various embodiments, networks 910 and/or 912 may include any combination of networks described herein or any other type of network capable of facilitating communication across networks 910 and/or 912.

In some embodiments, transportation management vehicle device 918 may include a provider communication device configured to communicate with users, such as drivers, passengers, pedestrians, and/or other users. In some embodiments, transportation management vehicle device 918 may communicate directly with transportation management system 902 or through another provider computing device, such as provider computing device 916. In some embodiments, a requestor computing device (e.g., device 924) may communicate via a connection 926 directly with transportation management vehicle device 918 via a communication channel and/or connection, such as a peer-to-peer connection, Bluetooth connection, NFC connection, ad hoc wireless network, and/or any other communication channel or connection. Although FIG. 9 shows particular devices communicating with transportation management system 902 over networks 910 and 912, in various embodiments, transportation management system 902 may expose an interface, such as an application programming interface (API) or service provider interface (SPI) to enable various third parties which may serve as an intermediary between end users and transportation management system 902.

In some embodiments, devices within a vehicle may be interconnected. For example, any combination of the following may be communicatively connected: vehicle 914, provider computing device 916, provider tablet 920, transportation management vehicle device 918, requestor computing device 924, requestor tablet 922, and any other device (e.g., smart watch, smart tags, etc.). For example, transportation management vehicle device 918 may be communicatively connected to provider computing device 916 and/or requestor computing device 924. Transportation management vehicle device 918 may establish communicative connections, such as connections 926 and 928, to those devices via any suitable communication technology, including, e.g., WLAN technologies implementing the IEEE 902.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 902 using applications executing on their respective computing devices (e.g., 916, 918, 920, and/or a computing device integrated within vehicle 914), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 914 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 902. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 10:
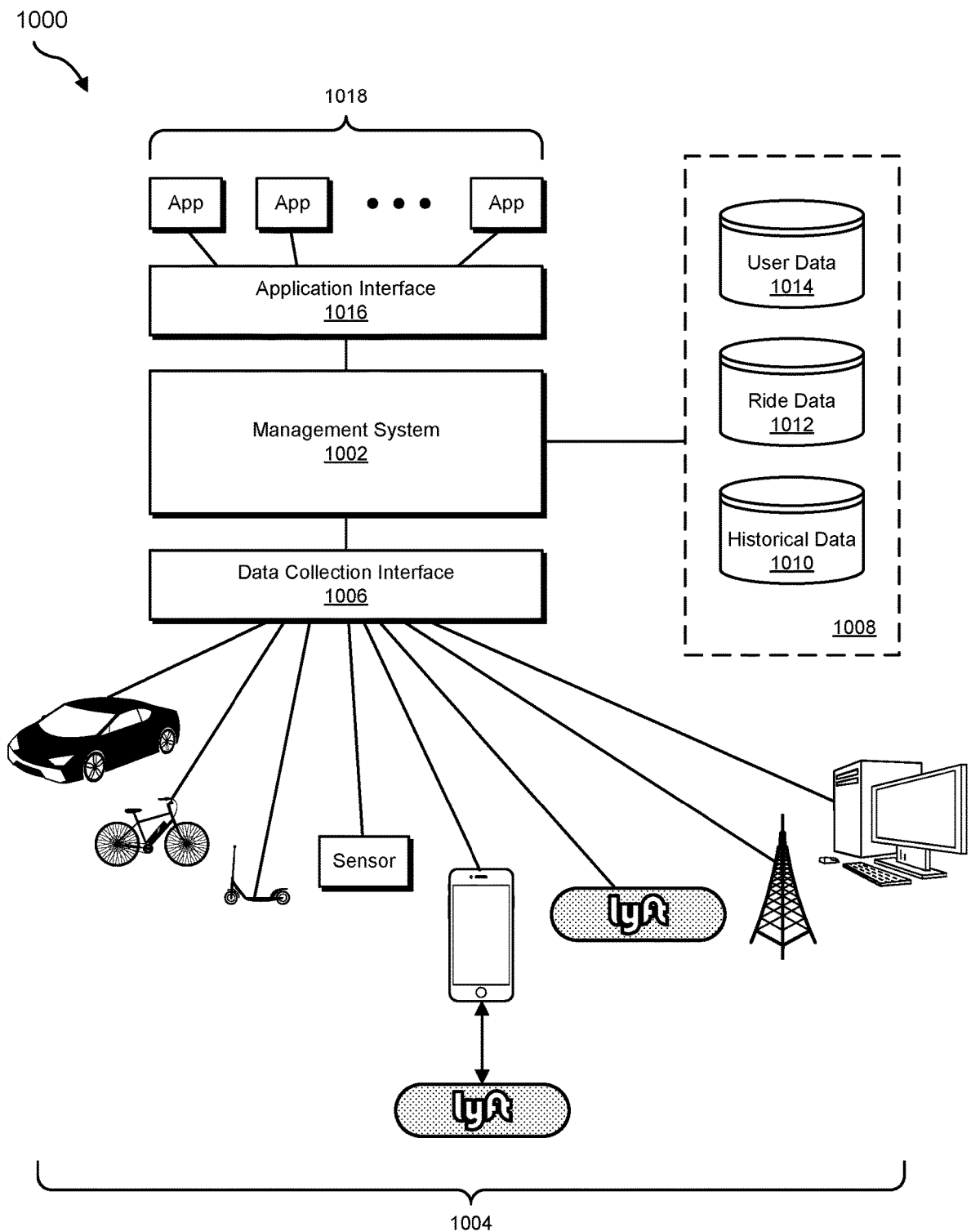
FIG. 10 is an illustration of an example data collection and application management system.

FIG. 10 shows a data collection and application management environment 1000, in accordance with various embodiments. As shown in FIG. 10, management system 1002 may be configured to collect data from various data collection devices 1004 through a data collection interface 1006. As discussed above, management system 1002 may include one or more computers and/or servers or any combination thereof. Data collection devices 1004 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1006 can include, e.g., an extensible device framework configured to support interfaces for each data collection device. In various embodiments, data collection interface 1006 may be extended to support new data collection devices as they are released and/or to update existing interfaces to support changes to existing data collection devices. In various embodiments, data collection devices may communicate with data collection interface 1006 over one or more networks. The networks may include any network or communication protocol as would be recognized by one of ordinary skill in the art, including those networks discussed above.

As shown in FIG. 10, data received from data collection devices 1004 can be stored in data store 1008. Data store 1008 may include one or more data stores, such as databases, object storage systems and services, cloud-based storage services, and other data stores. For example, various data stores may be implemented on a non-transitory storage medium accessible to management system 1002, such as historical data store 1010, ride data store 1012, and user data store 1014. Data stores 1008 can be local to management system 1002, or remote and accessible over a network, such as those networks discussed above or a storage-area network or other networked storage system. In various embodiments, historical data 1010 may include historical traffic data, weather data, request data, road condition data, or any other data for a given region or regions received from various data collection devices. Ride data 1012 may include route data, request data, timing data, and other ride related data, in aggregate and/or by requestor or provider. User data 1014 may include user account data, preferences, location history, and other user-specific data. Although certain data stores are shown by way of example, any data collected and/or stored according to the various embodiments described herein may be stored in data stores 1008.

As shown in FIG. 10, an application interface 1016 can be provided by management system 1002 to enable various apps 1018 to access data and/or services available through management system 1002. Apps 1018 may run on various user devices (including provider and requestor computing devices, such as those discussed above) and/or may include cloud-based or other distributed apps configured to run across various devices (e.g., computers, servers, or combinations thereof). Apps 1018 may include, e.g., aggregation and/or reporting apps which may utilize data 1008 to provide various services (e.g., third-party ride request and management apps). In various embodiments, application interface 1016 can include an API and/or SPI enabling third party development of apps 1018. In some embodiments, application interface 1016 may include a web interface, enabling web-based access to data 1008 and/or services provided by management system 1002. In various embodiments, apps 1018 may run on devices configured to communicate with application interface 1016 over one or more networks. The networks may include any network or communication protocol as would be recognized by one of ordinary skill in the art, including those networks discussed above, in accordance with an embodiment of the present disclosure.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
identifying a personal mobility vehicle (PMV) in use by a transportation requestor taking a trip;
predicting, based on navigational data, a first action comprising an upcoming movement of the PMV during the trip based on a first likelihood of the first action exceeding a first predetermined threshold during the trip;
predicting, based on a current state of the PMV, that the first action will be initiated by the PMV within a time frame based on a second likelihood of the first action exceeding a second predetermined threshold during the time frame, wherein the second predetermined threshold is higher than the first predetermined threshold;
sending a first command to the PMV to initiate a first output of a first visible-light signal through a visible-light indicator of the PMV in response to predicting the first action will be initiated;
prior to a completion of the first action, detecting a directional movement of the PMV based on an operation initiated by the transportation requestor using the PMV;
determining a change to the trip that prevents the completion of the first action during the trip based on the directional movement;
ending the first output of the first visible-light signal based on the change to the trip;
determining a second action for the PMV is being performed separate from the first action based on the directional movement; and
sending a second command to the PMV to initiate a second output of a second visible-light signal through the visible-light indicator based on the second action being performed.

2. The computer-implemented method of claim 1, wherein the navigational data comprises at least one of:
an origin of the trip;
a destination of the trip;
a predicted route for the trip;
a predicted condition along the trip; or
a predicted external condition along the trip.

3. The computer-implemented method of claim 1, wherein the trip comprises at least one of:
a planned route determined prior to a start of the trip; or
an adjusted route dynamically determined during the trip.

4. The computer-implemented method of claim 1, wherein predicting the first action comprises determining that a condition along the trip increases the first likelihood of the first action occurring during the trip, such that the first likelihood exceeds the first predetermined threshold.

5. The computer-implemented method of claim 1, wherein at least one of the first visible-light signal or the second visible light signal comprises a navigation indicator projected onto a physical path on which the PMV is traveling, and wherein the sending the first command causes the navigation indicator to be projected onto the physical path.

6. The computer-implemented method of claim 1, wherein the current state of the PMV comprises at least one of:
a location of the PMV; or
a speed of the PMV.

7. The computer-implemented method of claim 1, wherein predicting that the first action of the PMV will be initiated within the time frame comprises:
detecting the current state of the PMV; and
determining that a timing of the current state of the PMV indicates the first action of the PMV will be initiated within the time frame.

8. The computer-implemented method of claim 1, wherein the first command to the PMV to initiate the first visible-light signal comprises a strength of an intensity of the first visible-light signal based on the current state of the PMV.

9. The computer-implemented method of claim 1, further comprising:
detecting a changed state of the PMV; and
sending an additional command to the PMV based on the changed state of the PMV.

10. The computer-implemented method of claim 9, wherein the additional command comprises a change command to the PMV to change a property of the first visible-light signal.

11. A system comprising:
an identification module, stored in a memory, that identifies a PMV in use by a transportation requestor taking a trip;
a prediction module, stored in the memory, that predicts, based on navigational data, at least one first action comprising an upcoming navigation of the PMV during the trip based on a first likelihood of the at least one first action exceeding a first predetermined threshold during the trip and dynamically adjusts the navigational data based on a changed condition on the trip;
a determination module, stored in the memory, that predicts, based on a current state of the PMV, that the at least one first action of the PMV will be initiated within a time frame based on a second likelihood of the at least one first action exceeding a second predetermined threshold during the time frame, wherein the second predetermined threshold is higher than the first predetermined threshold;
a command module, stored in the memory, that sends a first command to the PMV to initiate a first visual output of at least one first visible-light signal at a power level of the first visual output through a visible-light indicator of the PMV in response to predicting the at least one first action will be initiated, detects, prior to a completion of the at least one first action, a directional movement of the PMV based on an operation initiated by the transportation requestor using the PMV, determines a change to the trip that prevents the completion of the first action during the trip based on the directional movement, ends the first visual output based on the change to the trip, determines at least one second action for the PMV is being performed that is separate from the first action based on the directional movement, and sends a second command to the PMV to initiate a second visual output of at least one second visible-light signal through the visible-light indicator based on the at least one second action being performed; and
at least one physical processor that executes the identification module, the prediction module, the selection module, the determination module, and the command module.

12. The system of claim 11, wherein the navigational data comprises at least one of:
an origin of the trip;
a destination of the trip;
a predicted route for the trip;
a predicted condition along the trip; or
a predicted external condition along the trip.

13. The system of claim 11, wherein the trip comprises a planned route determined prior to a start of the trip.

14. The system of claim 11, wherein the prediction module predicts the at least one first action by determining that a condition along the trip increases the first a likelihood of the at least one first action occurring during the trip, such that the first likelihood exceeds the first predetermined threshold.

15. The system of claim 11, wherein at least one of the first visible-light signal or the at least one second visible light signal comprises a navigation indicator projected onto a physical path on which the PMV is traveling, and wherein the command module further projects the navigation indicator onto the physical path.

16. The system of claim 11, wherein the current state of the PMV comprises at least one of:
   a location of the PMV; or
   a speed of the PMV.

17. The system of claim 11, wherein the determination module further predicts that the at least one first action of the PMV will be initiated within the time frame by:
   detecting the current state of the PMV; and
   determining that a timing of the current state of the PMV indicates the at least one action of the PMV will be initiated within the time frame.

18. The system of claim 11, wherein the power level comprises a first strength of a luminosity of the at least one first visible-light signal lower than a second strength of the luminosity of the at least one first visible-light signal.

19. The system of claim 11, wherein:
   the determination module further detects a changed state of the PMV; and
   the command module further sends an additional command to the PMV based on the changed state of the PMV.

20. A non-transitory computer-readable medium comprising:
   computer-readable instructions that, when executed by at least one hardware processor of a computing device, cause the computing device to:
      identify a PMV in use by a transportation requestor taking a trip;
      predict, based on navigational data, at least one first action comprising an upcoming navigational movement of the PMV during the trip based on a first likelihood of the at least one first action exceeding a first predetermined threshold during the trip;
      predict, based on a current state of the PMV, that the at least one first action of the PMV will be initiated within a time frame based on a second likelihood of the at least one first action exceeding a second predetermined threshold during the time frame, wherein the second predetermined threshold is higher than the first predetermined threshold;
      send a first command to the PMV to initiate a first output of a first visible-light signal at a first signal level of the first visual output through a visible-light indicator of the PMV in response to predicting the at least one first action will be initiated;
      prior to a completion of the at least one first action, detect a directional movement of the PMV based on an operation initiated by the transportation requestor using the PMV;
      determine a change to the trip that prevents the completion of the at least one first action during the trip based on the directional movement;
      end the first output of the first visual output at the first signal level based on the change to the trip;
      determine a second action for the PMV is being performed that is separate from the first action based on the directional movement; and
      send a second command to the PMV to initiate a second output of a second visible-light signal through the visible-light indicator based on the second action being performed.

\* \* \* \* \*